United States Patent
Nakamura

(10) Patent No.: US 7,799,181 B2
(45) Date of Patent: *Sep. 21, 2010

(54) METHOD FOR CONTROLLING A MULTI-PULSE RECORD WAVEFORM AT HIGH VELOCITY IN A PHASE CHANGE OPTICAL MEDIUM

(75) Inventor: Yuki Nakamura, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 718 days.

This patent is subject to a terminal disclaimer.

(21) Appl. No.: 11/491,241

(22) Filed: Jul. 24, 2006

(65) Prior Publication Data

US 2007/0048665 A1 Mar. 1, 2007

Related U.S. Application Data

(60) Division of application No. 10/638,500, filed on Aug. 12, 2003, now Pat. No. 7,193,950, which is a continuation of application No. 09/795,436, filed on Mar. 1, 2001, now Pat. No. 6,631,109.

(30) Foreign Application Priority Data

Mar. 3, 2000 (JP) ............................. 2000-058399

(51) Int. Cl.
*C23C 14/06* (2006.01)
(52) U.S. Cl. .................. 204/192.15; 204/192.16; 204/192.22; 369/59.11; 369/53.3
(58) Field of Classification Search ............ 204/192.15, 204/192.16, 192.22
See application file for complete search history.

(56) References Cited

U.S. PATENT DOCUMENTS 5,150,352 A 9/1992 Kurihara
5,646,924 A 7/1997 Nonoyama et al.
5,974,025 A * 10/1999 Yamada et al. ............... 369/288

(Continued)

FOREIGN PATENT DOCUMENTS

| EP | 0 442 566 A1 | 8/1991 |
| EP | 0 737 962 A2 | 10/1996 |
| EP | 0 802 531 A2 | 10/1997 |
| EP | 0 898 272 A2 | 2/1999 |
| EP | 0 986 054 A1 | 3/2000 |

(Continued)

OTHER PUBLICATIONS

District Court Judgment, No. 06-C-462-C.
CAFC Judgment, No. 2007-1567.

*Primary Examiner*—Nam X Nguyen
*Assistant Examiner*—Jason M Berman
(74) *Attorney, Agent, or Firm*—Dickstein Shapiro LLP

(57) ABSTRACT

In an optical recording method and apparatus of the present invention, a driving power is applied to a light source to control emission of a light beam to a recording layer of an optical storage medium, the driving power including a sequence of mark and space portions, each mark portion having a pulse width that corresponds to a multiple of a period T of a write clock. A multi-pulse waveform of each mark portion of the driving power includes a front-end portion, a multi-pulse portion and a tail-end portion, the front-end portion having a first pulse width t1 with a high-power write level Pw and starting from a middle-power erase level Pe, the multi-pulse portion including write pulses each having a second pulse width t2 with the write level Pw and a third pulse width t3 with a low-power base level Pb, the multi-pulse portion having a duty ratio z=t2/(t2+t3), and the tail-end portion having a fourth pulse width t4 with the base level Pb and ending at the erase level Pe. The waveform is controlled, when a linear velocity of rotation of the medium is set in a range from 5 m/s to 28 m/s, such that the first pulse width t1 ranges 0.1 T to 1 T and the fourth pulse width t4 ranges 0.2 T to 1.3 T.

2 Claims, 5 Drawing Sheets

U.S. PATENT DOCUMENTS

| | | |
|---|---|---|
| 6,192,024 B1 | 2/2001 | Inoue et al. |
| 6,280,810 B1 | 8/2001 | Nakamura et al. |
| 6,424,610 B2 | 7/2002 | Ohno |
| 6,449,240 B1 | 9/2002 | Kikukawa et al. |
| 6,459,666 B1 | 10/2002 | Yokui |
| 6,461,710 B1 | 10/2002 | Kikukawa |
| 6,560,182 B1 | 5/2003 | Nagayama et al. |
| 6,631,109 B2 * | 10/2003 | Nakamura ............ 369/59.11 |
| 6,657,946 B2 | 12/2003 | Okubo |
| 6,700,862 B2 | 3/2004 | Tsukuda et al. |
| 6,720,056 B2 | 4/2004 | Maeda |

FOREIGN PATENT DOCUMENTS

| | | |
|---|---|---|
| JP | 63-29336 A | 2/1988 |
| JP | 63-266632 | 11/1988 |
| JP | 63-266633 | 11/1988 |
| JP | 09-282661 | 10/1997 |
| JP | 10-083553 | 3/1998 |
| JP | 11-70738 | 3/1999 |
| JP | 11-115313 | 4/1999 |
| JP | 2000/322739 | 11/2000 |
| WO | WO 98/36411 A2 | 8/1998 |

* cited by examiner

METHOD FOR CONTROLLING A MULTI-PULSE RECORD WAVEFORM AT HIGH VELOCITY IN A PHASE CHANGE OPTICAL MEDIUM

CROSS-REFERENCE TO RELATED APPLICATIONS

This application is a divisional of application Ser. No. 10/638,500, filed Aug. 12, 2003, now U.S. Pat. No. 7,193, 950, issued Mar. 20, 2007, which is a continuation of application Ser. No. 09/795,436, filed Mar. 1, 2001, now U.S. Pat. No. 6,631,109, issued Oct. 7, 2003, which are all hereby incorporated by reference.

The present invention is based on Japanese priority application No. 2000-058399, filed on Mar. 3, 2001, the entire contents of which are hereby incorporated by reference.

BACKGROUND OF THE INVENTION

1. Field of the Invention

The present invention relates to an optical recording method and apparatus that records information onto an optical storage medium at a high speed by emitting a light beam to a recording layer of the storage medium. Further, the present invention relates to an optical storage medium that stores information recorded by using the optical recording method and apparatus.

2. Description of the Related Art

Recently, optical storage media, including CD-R (compact disk recordable), CD-RW (compact disk rewritable) and so on, become widespread. Each storage medium is provided for recording information thereon by focusing a light beam onto a recording layer of the medium and changing the phase of the recording layer material.

As disclosed in Japanese Laid-Open Patent Application No. 63-29336, an optical recording method that records information onto a recording layer of an optical recording medium by emitting light to the recording layer of the medium is known. In the optical recording method of the above document, a light source driving waveform is applied to a light source to control emission of a light beam to the recording layer of the medium based on a write data modulation method. Moreover, there is known an optical recording method that determines an optimum light source driving waveform (including the write power and the write pulse width), which is applied to the light source, based on a readout signal of the recorded information derived from a reflection light beam from the optical disk.

Further, several optical recording methods have been proposed for improvement of the quality of the write signal recorded on a rewritable phase-change storage medium. For example, Japanese Laid-Open Patent Application No. 63-266632 discloses such improvement method. In the conventional method of the above document, a pulse width modulation (PWM) method is utilized for application of a multi-pulse light source driving waveform to the light source to control emission of a light beam from the light source to a rewritable phase-change optical disk having a recording layer with a large crystallization speed. The conventional method provides the driving waveform that is effective in recording a long amorphous mark on the recording layer of the optical disk.

In addition, Japanese Laid-Open Patent Application No. 63-266633 and U.S. Pat. No. 5,150,352 disclose an optical recording method which eliminates positional variations of a mark edge and improves the jitter characteristics of an optical disk by applying a driving waveform including a front-end portion or a tail-end portion having an increased pulse width or with an increased power level to the light source.

Further, the rewritable compact disk standards (the orange book, part III, ver. 2.0) provide the recommended specifications of 1× to 4× linear velocity recording of the rewritable recording media. The linear velocities 1× to 4× according to the standards (the orange book, part III, ver. 2.0) range from 1.2 m/s to 5.6 m/s. The recording speeds of the media in this range require a relatively long time to record information onto the media. There is an increasing demand for a reliable CD-RW drive that is able to carry out error-free information recording with good write-erase characteristics at higher recording speeds. Preparations of high-speed specifications of range higher than 4× and up to 20× linear velocity recording for the rewritable compact disk standards are now under way. The linear velocities range higher than 4× and up to 20× according to the standards (the orange book, part III) range higher than 5.6 m/s and up to 28 m/s.

Accordingly, it is desirable to provide an optical recording method and apparatus that ensures good write/erase characteristics of the rewritable phase-change medium and retains the compatibility with the write-once storage medium when high-speed recording (equivalent to the range higher than 4× and up to 20× linear velocity recording) is performed. The conventional recording methods and devices of the above documents are not yet adequate to attain the goal.

SUMMARY OF THE INVENTION

It is a general object of the present invention to provide an optical recording method and apparatus in which the aforementioned problems are eliminated. Another object of the present invention is to provide an optical recording method and apparatus that ensures good write/erase characteristics of the rewritable phase-change medium and retains the compatibility with the write-once storage medium when high-speed recording is performed.

Another object of the present invention is to provide an optical recording method and apparatus that provides increases of initial characteristics and overwrite performance of the rewritable phase-change medium.

Another object of the present invention is to provide an optical storage medium that stores information recorded by using the optical recording method and apparatus such that good write/erase characteristics of the rewritable phase-change medium are ensured and the compatibility with the write-once storage medium is retained when high-speed recording is performed.

The above-mentioned objects of the present invention are achieved by an optical recording method which records a sequence of data blocks onto a recording layer of an optical recording medium by emitting light to the recording layer of the medium and changing a phase of a recording material of the recording layer, the method comprising the steps of: applying a light source driving power to a light source to control emission of a light beam to the recording layer of the medium, the driving power including a sequence of mark and space portions, each mark portion having a pulse width that corresponds to a multiple of a period T of a write clock based on a write data modulation method; setting a multi-pulse waveform of each mark portion of the driving power that includes a front-end portion, a multi-pulse portion and a tail-end portion, the front-end portion having a first pulse width t1 with a high-power write level Pw and starting from a middle-power erase level Pe, the multi-pulse portion including a sequence of write pulses each having a second pulse width t2 with the write level Pw and a third pulse width t3 with a low-power base level Pb, the multi-pulse portion having a given duty ratio z=t2/(t2+t3), and the tail-end portion having a fourth pulse width t4 with the base level Pb and ending at the erase level Pe; setting a linear velocity of rotation of the medium at a controlled speed; and controlling the waveform when the linear velocity of rotation of the medium is set in a high-speed range higher than 5.6 m/s and up to 28 m/s, such that the first pulse width t1 of the front-end portion ranges 0.1 T to 1 T and the fourth pulse width t4 of the tail-end portion ranges 0.2 T to 1.3 T.

The above-mentioned objects of the present invention are achieved by an optical recording apparatus which records a sequence of data blocks onto a recording layer of an optical recording medium by emitting light to the recording layer of the medium and changing a phase of a recording material of the recording layer, the apparatus comprising: a light source driver unit which applies a light source driving power to a light source to control emission of a light beam to the recording layer of the medium, the driving power including a sequence of mark and space portions, each mark portion having a pulse width that corresponds to a multiple of a period T of a write clock based on a write data modulation method; a write power determination unit which sets a multi-pulse waveform of each mark portion of the driving power that includes a front-end portion, a multi-pulse portion and a tail-end portion, the front-end portion having a first pulse width t1 with a high-power write level Pw and starting from a middle-power erase level Pe, the multi-pulse portion including a sequence of write pulses each having a second pulse width t2 with the write level Pw and a third pulse width t3 with a low-power base level Pb, the multi-pulse portion having a given duty ratio z=t2/(t2+t3), and the tail-end portion having a fourth pulse width t4 with the base level Pb and ending at the erase level Pe; and a controller which sets a linear velocity of rotation of the medium at a controlled speed, wherein the controller causes the write power determination unit to control the waveform when the linear velocity of rotation of the medium is set in a high-speed range higher than 5.6 m/s and up to 28 m/s, such that the first pulse width t1 of the front-end portion ranges 0.1 T to 1 T and the fourth pulse width t4 of the tail-end portion ranges 0.2 T to 1.3 T.

The above-mentioned objects of the present invention are achieved by an optical storage medium which stores information recorded by using an optical recording method that records a sequence of data blocks onto a recording layer of an optical recording medium by emitting light to the recording layer of the medium and changing a phase of a recording material of the recording layer, the optical recording method comprising the steps of: applying a light source driving power to a light source to control emission of a light beam to the recording layer of the medium, the driving power including a sequence of mark and space portions, each mark portion having a pulse width that corresponds to a multiple of a period T of a write clock based on a write data modulation method; setting a multi-pulse waveform of each mark portion of the waveform that includes a front-end portion, a multi-pulse portion and a tail-end portion, the front-end portion having a first pulse width t1 with a high-power write level Pw and starting from a middle-power erase level Pe, the multi-pulse portion including a sequence of write pulses each having a second pulse width t2 with the write level Pw and a third pulse width t3 with a low-power base level Pb, the multi-pulse portion having a given duty ratio z=t2/(t2+t3), and the tail-end portion having a fourth pulse width t4 with the base level Pb and ending at the erase level Pe; setting a linear velocity of rotation of the medium at a controlled speed; and controlling the waveform when the linear velocity of rotation of the medium is set in a high-speed range higher than 5.6 m/s and up to 28 m/s, such that the first pulse width t1 of the front-end portion ranges 0.1 T to 1 T and the fourth pulse width t4 of the tail-end portion ranges 0.2 T to 1.3 T, the optical storage medium comprising the sequence of data blocks recorded on the recording layer, each data block including first information indicative of the first pulse width t1 of the front-end portion and second information indicative of the fourth pulse width t4 of the tail-end portion in the light source driving waveform.

In the optical recording method and apparatus of the present invention, the driving power is applied to the light source to control emission of a light beam to the recording layer of the optical storage medium, the driving power including a sequence of mark and space portions, each mark portion having a pulse width that corresponds to a multiple of the period T of the write clock. The waveform of each mark portion of the driving power includes the front-end portion, the multi-pulse portion and the tail-end portion, the front-end portion having the first pulse width t1 with the write level Pw and starting from the erase level Pe, the multi-pulse portion including the write pulses each having the second pulse width t2 with the write level Pw and the third pulse width t3 with the base level Pb, the multi-pulse portion having the duty ratio z=t2/(t2+t3), and the tail-end portion having the fourth pulse width t4 with the base level Pb and ending at the erase level Pe. The waveform is controlled, when the linear velocity of rotation of the medium is set in a range higher than 5.6 m/s and up to 28 m/s, such that the first pulse width t1 ranges 0.1 T to 1 T and the fourth pulse width t4 ranges 0.2 T to 1.3 T. As the front-end edge and the tail-end edge of each mark (the amorphous phase) are accurately and definitely created on the recording layer of the rewritable phase-change medium when high-speed recording is performed, the optical recording method and apparatus of the present invention can ensure good write/erase characteristics of the rewritable phase-change medium and retain the compatibility with the write-once storage medium when high-speed recording is performed. The optical recording method and apparatus of the present invention are effective in increasing the initial characteristics and the overwrite performance of the rewritable phase-change medium.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of preferred embodiments of the present invention with reference to the accompanying drawings.

Figure 1:
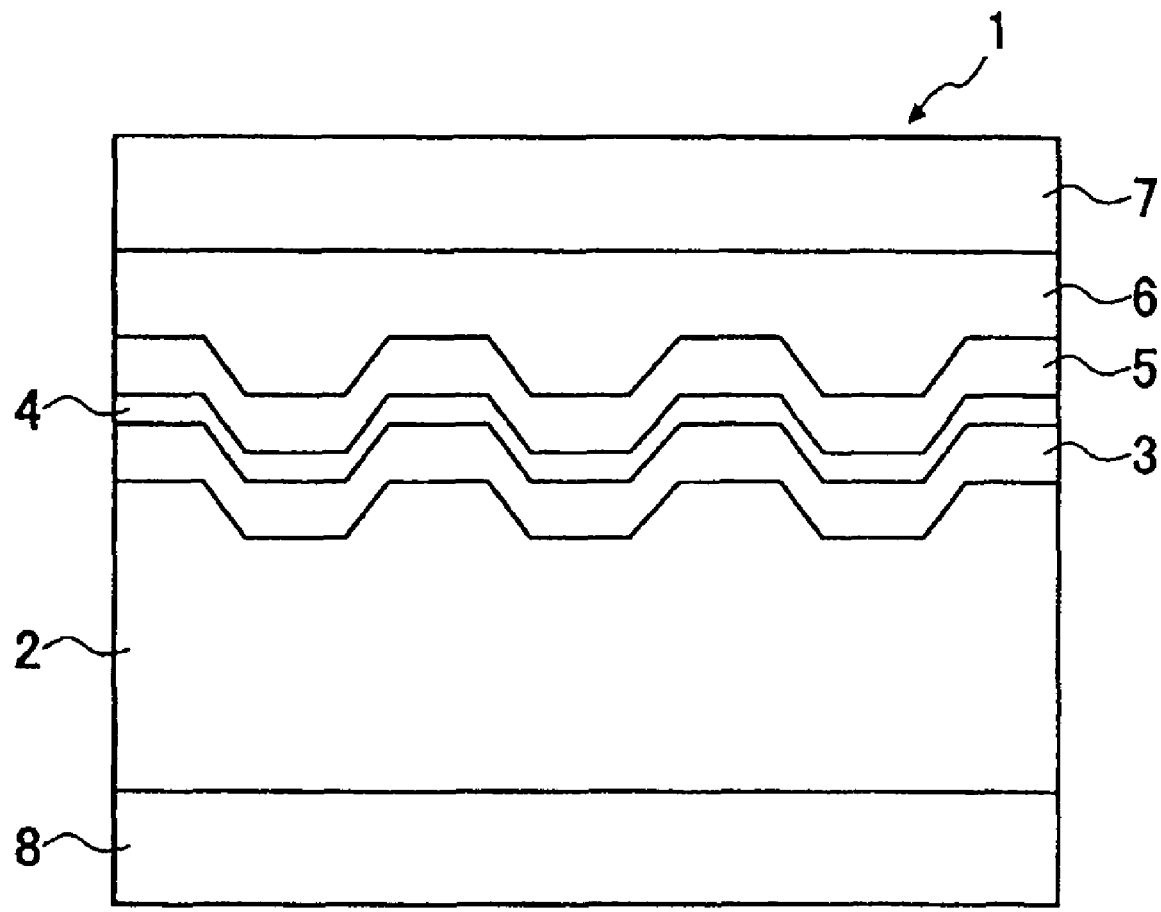
FIG. 1 is a cross-sectional diagram of one preferred embodiment of the optical storage medium of the invention.

FIG. 1 is a cross-sectional diagram of one preferred embodiment of the optical storage medium of the invention.

The optical storage medium of the present embodiment is a rewritable phase-change medium (CD-RW) in which a recording layer of a phase-change material is formed on a substrate. As shown in FIG. 1, in the storage medium 1 of this embodiment, a substrate 2, a lower protective layer 3, a recording layer 4, an upper protective layer 5, and a reflection/heat-radiation layer 6 are provided. The lower protective layer 3, the recording layer 4, the upper protective layer 5 and the reflection/heat-radiation layer 6 are deposited, in this order, on the front surface of the substrate 2. Further, an overcoat layer 7 may be provided on the reflection/heat-radiation layer 6, and a hard-coat layer 8 may be provided on the back surface of the substrate 2.

In the medium 1 of the present embodiment, the substrate 2 is provided in order to support the recording layer 4. When a read/write laser beam emitted by a laser light source is incident to the substrate 2 of the storage medium 1, the substrate 2 must be transparent to the incident laser beam having a wavelength of the read/write laser beam used. A suitable transparent material of the substrate 2 is selected from among glass materials, ceramics materials and resin materials. Resin materials are more suitable for the substrate 2 because of the transparency and the ease of molding.

A suitable resin material of the substrate 2 may be selected from one of resin materials including polycarbonate resins, acrylic resins, epoxy resins, polystyrene resins, styrene-acrylonitrile copolymer resins, polyethylene resins, polypropylene resins, silicon-based resins, fluorine-based resins, acrylonitrile-butadiene-styrene (ABS) resins and urethane resins. In particular, polycarbonate resins or acrylic resins are selected as a more suitable material of the substrate 2, because of the ease of molding, the required optical characteristics and the cost effectiveness. A set of guide grooves may be provided on the transparent substrate 2.

In the storage medium 1 of the present embodiment, the lower and upper protective layers 3 and 5 are made of a dielectric material because of the required thermal and optical characteristics. A suitable material of the protective layers 3 and 5 may be selected from a single-component or mixture dielectric materials including oxides of $SiO_2$, SiO, ZnO, $SnO_2$, $TiO_2$, $InO_2$, Mg, $ZrO_2$, etc., nitrides of $Si_3N_4$, AlN, TiN, BN, ZrN, etc., sulphides of ZnS, $In_2S_3$, $TaS_4$, etc., carbides of SiC, TaC, B4C, WC, TiC, ZrC, etc., and diamond-state carbon. The lower and upper protective layers 3 and 5 are deposited by using physical vapor deposition, sputtering, ionplating, or chemical vapor deposition. Because of the productivity and the cost, sputtering is selected as the more suitable one for the formation of the lower and upper protective layers 3 and 5. An optimum thickness of the protective layers 3 and 5 may be determined in view of the required thermal and optical characteristics. Typically, the thickness of the protective layers 3 and 5 ranges from 10 nm to 5000 nm.

In the storage medium 1 of the present embodiment, the recording layer 4 is made of a phase-change material. A suitable phase-change material of the recording layer 4 may be selected from alloy-based phase-change materials including GeTe, GeTeSe, GeTeS, GeSeSb, GeAsSe, InTe, SeTe, SeAs, Ge—Te—(Sn, Au, Pd), GeTeSeSb, GeTeSb, AgInSbTe, etc. The composition of elemental substances in each phase-change material may be optimized in accordance with a linear velocity of rotation of the medium. A small amount of impurities, selected from substances including B, N, C, O, Si, P, S, Ge, Se, Al, Ti, Zr, V, Mn, Fe, Co, Ni, Cr, Cu, Zn, Sn, Pd, Pt, Au, etc., may be mixed with the phase-change material of the recording layer 4.

Specifically, the selection of AgInSbTe as the phase-change material of the recording layer 4 is more suitable because it provides definite boundaries between crystalline areas and non-crystalline (or amorphous) areas, which suits to a mark-edge recording technique (which will be described later) that is used by the optical recording method and apparatus of the present invention. A small amount of impurities (for example, N) may be added to the phase-change material, which allows a margin of the linear velocity of the medium rotation to be increased.

In the storage medium 1 of the present embodiment, the composition of the phase-change material (AgInSbTe) of the recording layer 4 is represented by the formula $Ag_\alpha In_\beta Sb_\gamma Te_\delta$ $0.1 \leq \alpha \leq 3.0$
$5.0 \leq \beta \leq 12.0$
$60.0 \leq \gamma \leq 72.0$
$22.0 \leq \delta \leq 30.0$.

A desired thickness of the phase-change material of the recording layer 4 ranges from 13 nm to 17 nm. With the above composition and the above thickness of the phase-change material of the recording layer 4, the present embodiment can ensure good write/erase characteristics of the rewritable phase-change medium and retain the compatibility with the write-once storage medium even when high-speed recording is performed.

In the storage medium 1 of the present embodiment, the recording layer 4 is deposited on the substrate 2 by using physical vapor deposition, sputtering, ionplating, or chemical vapor deposition. Because of the productivity and the cost, sputtering is selected as the more suitable one for the formation of the recording layer 4.

Further, in the storage medium 1 of the present embodiment, the reflection/heat radiation layer 6 serves to reflect the read/write light beam and dissipate heat produced during recording. A suitable material of the reflection/heat radiation layer 6 may be selected from single-component metals including Ag, Au, Al, or mixture alloys including Ti, Si, Cr, Ta, Cu, Pd, C, etc. Preferably, the reflection/heat radiation layer 6 is made of an aluminum-based alloy because of the required thermal and optical characteristics and the productivity. A desired composition of the material of the reflection/heat radiation layer 6 and a desired thickness of the reflection/heat radiation layer 6 may be determined in view of the required thermal and optical characteristics.

In the storage medium 1 of the present embodiment, the over-coat layer 7 is made of a resin material containing, as the major component, an optical curing resin or an electron beam curing resin. Because of the ease of curing and the ease of film formation, a resin material containing, as the major component, a UV (ultraviolet ray) curing resin is more suitable for the material of the over-coat layer 7. The film formation of the over-coat layer 7 is performed by using a dipping method or a spin-coat method.

In order to conform to the high-speed specifications of range higher than 4× and up to 20× linear velocity recording for the expected rewritable compact disk standards, it is necessary that the optical storage medium 1 of the present embodiment be configured to meet the conditions related to the phase-change critical linear velocity (which will be called the velocity "vo").

Suppose that a measuring device (or a pickup) for measuring the phase-change critical linear velocity (the velocity "vo") of the medium meets the following conditions: the wavelength of a read/write laser beam emitted by the laser light source is 789 nm; and the numerical aperture (NA) of the objective lens is 0.49. Further, suppose that "v" indicates a relative velocity of the medium to the optical recording apparatus during the recording, "vwh" indicates the highest relative velocity of the medium during the recording, and "vwl" indicates the lowest relative velocity of the medium during the recording.

A measurement power "$P_E$" of the measuring device (or the pickup) used when measuring the velocity "vo" of the medium is defined by the formula: $P_E=0.75 P_{OH}$ where "$P_{OH}$" indicates an optimum recording power when the linear velocity "v" of the medium 1 is set at the highest linear velocity "vwh".

The measurement of the velocity "vo" is performed when the medium 1 is moved to the pickup at the relative velocity "v" and the pickup emits a write laser beam to the medium from the laser light source at the measurement power "$P_E$". At this time, a pulsed light source emission waveform, which is ordinarily used for the recording of conventional phase-change media, is not used for the emission of the laser beam. A direct-current (DC) driving waveform is used for the emission of the write laser beam, and a reflectivity of the recorded portion of the medium is detected based on a reflection beam from the medium by a reproducing part of the optical recording apparatus. The reflectivity obtained at this time is indicated by a variable R(v) with respect to the relative velocity "v". Suppose that the wavelength of the read laser beam is set at 789 nm.

Figure 2:
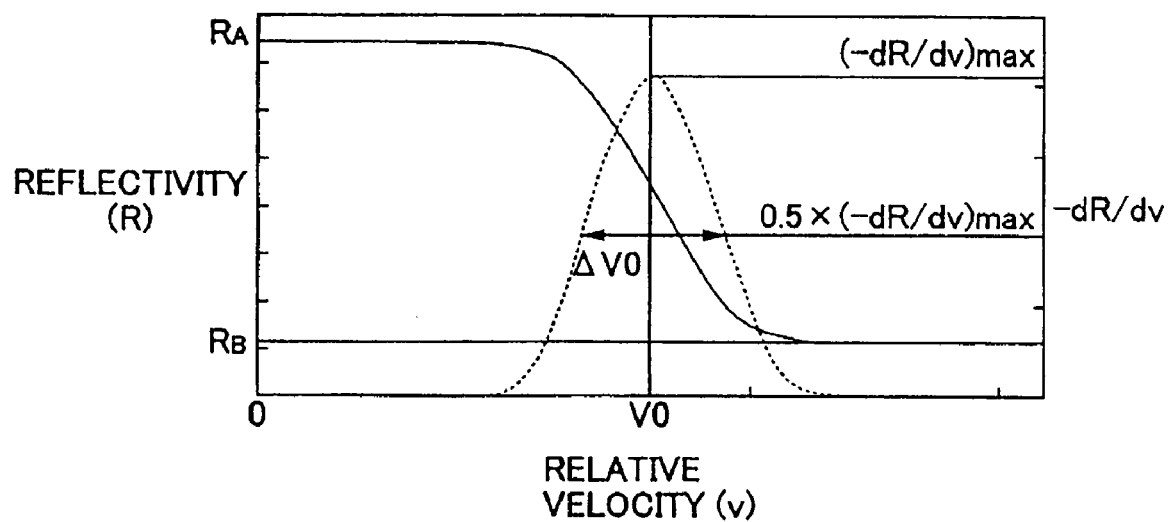
FIG. 2 is a diagram for explaining a characteristic of storage medium's reflectivity with respect to relative velocity and a characteristic of the differential coefficient of the reflectivity with respect to relative velocity.

FIG. 2 shows a characteristic of the reflectivity "R" of the medium 1 of the present embodiment with respect to the relative velocity "v" and a characteristic of the differential coefficient "–dR/dv" of the reflectivity with respect to relative velocity "v".

As shown in FIG. 2, as the relative velocity "v" increases, the reflectivity "R" decreases from an initial saturation point "$R_A$". When a certain point of the relative velocity "v" is reached, the decrease of the reflectivity "R" is stopped at a secondary saturation point "$R_B$". Conversely, as the relative velocity "v" decreases, the reflectivity "R" increases from the secondary saturation point $R_B$, and when a certain point of the relative velocity "v" is reached, the increase of the reflectivity "R" is stopped at the initial saturation point $R_A$.

As is apparent from FIG. 2, the phase-change critical relative velocity "vo" of the medium is defined by a value of the relative velocity "v" when the differential coefficient "–dR/dv" of the reflectivity is the maximum "(–dR/dv)max" (the peak point). A margin "Δvo" of the velocity "vo" is defined by an effective range of the linear velocity "v" when the differential coefficient "–dR/dv" of the reflectivity decays to half the maximum "(–dR/dv)max".

In the storage medium 1 of the present embodiment, the phase-change material of the recording layer is selected such that it satisfies the following conditions:

$$vo \geq 0.7 vwh$$

where "vo" is the phase-change critical linear velocity, and "vwh" is the highest linear velocity.

It has been confirmed from experiments that, when the optical storage medium 1 of the present embodiment is configured to meet the above conditions (in other words, the velocity "vo" of the medium 1 is set to satisfy the above conditions), the medium 1 provides good write/erase characteristics as well as improved overwrite performances when the recording is performed at the highest linear velocity "vwh".

On the other hand, when the medium 1 does not meet the above conditions, it provides poor write/erase characteristics as well as undesired overwrite performances when the recording is performed at the highest linear velocity "vwh". The primary reason is that it is difficult that such medium 1 returns the state of a mark on the medium with the reflectivity being at the secondary saturation point $R_B$ back to the state of a space on the medium with the reflectivity being at the initial saturation point $R_A$.

Further, in the storage medium 1 of the present embodiment, it is preferred that the phase-change material of the recording layer is selected such that it satisfies the following conditions:

$$vo \leq 3.0 vwl$$

where "vo" is the phase-change critical linear velocity, and "vwl" is the lowest linear velocity.

It has been confirmed from experiments that, when the optical storage medium 1 of the present embodiment is configured to meet the above conditions (in other words, the velocity "vo" of the medium 1 is set to satisfy the above conditions), the medium 1 provides good mark-formation characteristics as well as improved overwrite performances when the recording is performed at the lowest linear velocity "vwl".

The margin "Δvo" of the medium 1 indicates the tendency of deterioration of the recording signal at the highest linear velocity "vwh". In the storage medium 1 of the present embodiment, it is preferred that the phase-change material of the recording layer is selected such that it satisfies the following conditions:

$$\Delta vo/vo < 0.4$$

where "vo" is the phase-change critical linear velocity, and "Δvo" is the margin of the velocity "vo".

It has been confirmed from experiments that, when the optical storage medium 1 of the present embodiment is configured to meet the above conditions (in other words, the velocity "vo" of the medium 1 is set to satisfy the above conditions), the medium 1 provides improved stability of write/erase characteristics when the recording is performed at the highest linear velocity "vwh".

Further, in the storage medium 1 of the present embodiment, it is preferred that the phase-change material of the recording layer is selected such that it satisfies the following conditions:

$$0.1 < R_A/R_B < 0.6$$

where "$R_A$" is the initial saturation point of the medium, and "$R_B$" is the secondary saturation point of the medium.

It has been confirmed from experiments that, when the optical storage medium 1 of the present embodiment is configured to meet the above conditions, the medium 1 provides a good mark/space contrast when the recording is performed.

Further, in the storage medium 1 of the present embodiment, it is preferred that the phase-change material of the recording layer is selected such that it satisfies the following conditions:

$$vwh/vwl \geq 2.5$$

where "vwh" is the highest linear velocity of the medium during the recording, and "vwl" is the lowest linear velocity of the medium during the recording.

It has been confirmed from experiments that, when the optical storage medium 1 of the present embodiment is configured to meet the above conditions, it makes it possible to perform the constant angular velocity (CAV) recording of a 120-mm diameter optical disk (currently the dominating one) in the recording linear velocities corresponding to the disk recording areas ranging from 46.5 mm diameter to 116 mm diameter.

Figure 3:
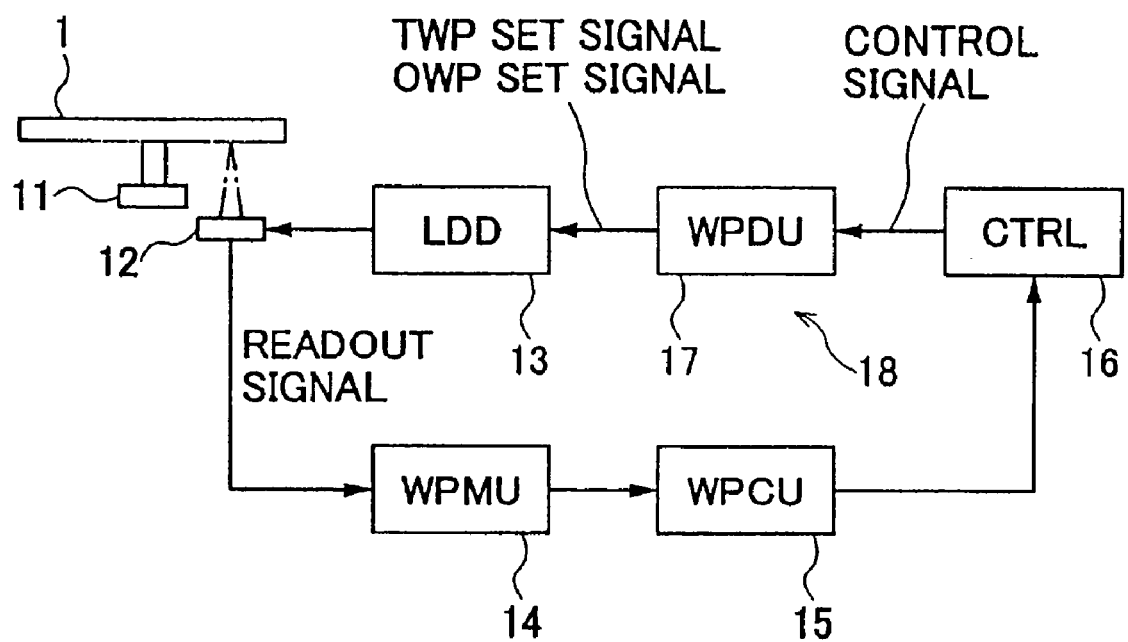
FIG. 3 is a block diagram of one preferred embodiment of the optical recording apparatus of the invention.

FIG. 3 shows one preferred embodiment of the optical recording apparatus of the invention. The optical recording apparatus of the present embodiment is configured to conform to the high-speed specifications of range higher than 4× and up to 20× linear velocity recording for the expected rewritable compact disk standards.

As shown in FIG. 3, in the optical recording apparatus of the present embodiment, the optical storage medium 1 is held on and rotated by a spindle motor 11. A controller (CTRL) 16 controls the spindle motor 11 so that the linear velocity of rotation of the medium 1 is set at a controlled speed. A pickup 12 having a laser light source (for example, a laser diode) and optical systems (for example, a focusing lens and an objective lens) is provided to focus a laser beam, emitted by the light source, onto the recording layer of the medium 1 and change the phase of the recording material of the layer. The pickup 12 includes a photodetector which detects a reflection laser beam reflected from the recording layer of the medium 1 and outputs a readout signal based on the reflection laser beam.

In the optical recording apparatus of FIG. 3, a User diode driver (LDD) 13 is provided to apply a laser driving power to the light source of the pickup 12 to control the emission of a laser beam to the recording layer of the medium 1. When recording of the medium 1 is performed, the LDD 13 applies the driving power to the light source of the pickup 12, and the light source emits the laser beam to the recording layer of the medium 1 to change the phase of the recording material of the layer. When reproducing of the medium 1 is performed, the photodetector of the pickup 12 detects the reflection laser beam reflected from the recording layer of the medium 1 and outputs the readout signal based on the reflection laser beam. In the optical recording apparatus of the present embodiment, the readout signal output by the photodetector of the pickup 12 is used to carry out the reproducing of the recorded information, the tracking servo control and the focusing servo control.

In the optical recording apparatus of FIG. 3, during the recording of the medium 1, the readout signal output by the pickup 12 is supplied to a write power monitoring unit (WPMU) 14. The write power monitoring unit 14 monitors the readout signal received from the pickup 12. A write power calculating unit (WPCU) 15 is provided to calculate the power (or the amplitude) of the readout signal and outputs the calculation result (the calculated power) to the controller 16. The controller 16 has a CPU (central processing unit), which controls the elements of the optical recording apparatus of the present embodiment. As described above, the controller 16 controls the rotating speed of the spindle motor 12 so that the linear velocity of rotation of the medium 1 is set at a controlled speed.

In the optical recording apparatus of FIG. 3, a write power determination unit (WPDU) 17 is provided to set a multi-pulse waveform of the laser driving power that is applied to the pickup 12. The controller 16 outputs a control signal to the WPDU 17 based on the feedback result (or the calculated power) from the MPCU 15, so that the WPDU 17 outputs a selected one of a test writing power (TWP) set signal and an optimum writing power (OWP) set signal to the LDD 13.

In the optical recording apparatus of the present embodiment, the pickup 12, the LDD 13, the WPDU 17 and the controller 16 form an optical information recording means 18. The optical information recording means 18 carries out a mark-edge recording process for the storage medium 1 wherein a sequence of data blocks (also called the write information), which corresponds to a sequence of mark and space portions of the driving power, are recorded onto the recording layer of the medium 1, each of the mark portions having a pulse width corresponding to a multiple of a period (T) of a write clock based on a PWM (pulse width modulation) method. In a case of the rewritable phase-change medium (CD-RW), the optical information recording means 18 converts each data block in the write information into a power level and a pulse width in the driving waveform by using an EFM (eight to fourteen modulation) process or another improved modulation technique based on the period T of the write clock.

Figure 4A:
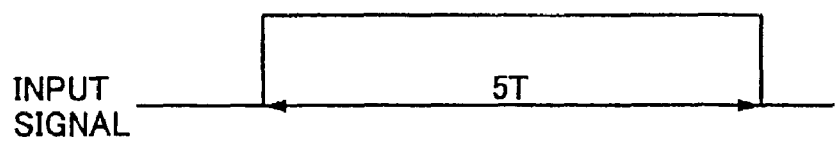
FIG. 4A and FIG. 4B are waveform diagrams for explaining a multi-pulse laser driving waveform used by the optical recording apparatus of FIG. 3.
Figure 4B:
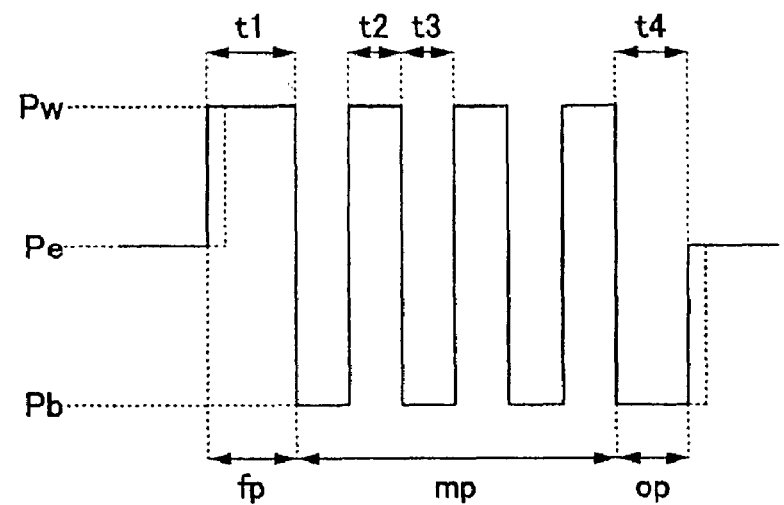

In the optical recording apparatus of the present embodiment, the WPDU 17 sets a multi-pulse laser waveform of the driving power in order to control the emission of a laser beam by the laser light source of the pickup 12 to the recording layer of the medium 1 (CD-RW). FIG. 4A and FIG. 4B are waveform diagrams for explaining the multi-pulse laser driving waveform used by the optical recording apparatus of FIG. 3.

FIG. 4A shows the waveform of a 5 T input signal where "T" indicates the period of the write clock in the optical recording apparatus of FIG. 3. The "5 T" input signal means that this pulsed signal has a pulse width that is 5 times the period T of the write clock. In the example of FIG. 4A, the high-level signal portion represents "1" of the write information and corresponds to a mark on the recording layer of the medium 1, and the low-level signal portions represent "0" of the write information and correspond to spaces on the recording layer of the medium 1.

FIG. 4B shows an example of the multi-pulse laser driving waveform that is set by the WPDU 17 of the present embodiment in response to the input signal of FIG. 4A.

As shown in FIG. 4A and FIG. 4B, the multi-pulse waveform, supplied from the WPDU 17 to the LDD 13, includes a front-end portion "fp", a multi-pulse portion "mp" and a tail-end portion "op". The front-end portion "fp" has a first pulse width "t1" with a high-power write level "Pw" and starts from a middle-power erase level "Pe". The multi-pulse portion "mp" includes a sequence of write pulses each having a second pulse width "t2" with the write level Pw and a third pulse width "t3" with a low-power base level "Pb". Suppose that the conditions: Pb<Pe<Pw are met. The multi-pulse portion "mp" has a given duty ratio z=t2/(t2+t3). The tail-end portion "op" has a fourth pulse width "t4" with the base level Pb and ends at the erase level Pe.

Generally, when one of the mark portions of the driving power is supplied to the light source of the pickup 12, a non-crystalline area (the amorphous phase) that represents "1" of the write information is formed as a mark on the recording layer of the medium 1 by the emission of a laser beam from the light source to the medium 1. The formation of the amorphous phase of the recording material on the recording layer of the medium 1 requires heating of the recording layer to an increased temperature above the melting point of the recording material and cooling of the recording layer for an adequate time after the heating.

In the waveform of FIG. 4B, the front-end portion "fp", which has the first pulse width t1 with the high-power write level Pw, provides the recording layer of the medium 1 with the energy needed to heat it to the increased temperature above the melting point. The multi-pulse portion "mp", which includes the Sequence of write pulses each having the second pulse width t2 with the write level Pw and the third pulse width t3 with the base level Pb, provides the recording layer with the energy needed to form the mark thereon. Hence, if the first pulse width t1 is set at an optimum value and the waveform of the present embodiment is applied, a front-end edge of the mark can be accurately and definitely formed on the recording layer of the medium 1.

Further, in the waveform of FIG. 4B, the tail-end portion "op", which has the fourth pulse width t4 with the low-power base level Pb, serves to cool the recording layer of the medium 1 for an adequate time after the heating. Hence, if the fourth pulse width t4 is set at an optimum value and the waveform of the present embodiment is applied, a tail-end edge of the mark can be accurately and definitely formed on the recording layer of the medium 1.

It is necessary to take into consideration the above points, in order to provide good write/erase characteristics of the rewritable phase-change media when high-speed recording (equivalent to the range higher than 4× and up to 20× linear velocity recording) is performed. To attain the objective of the present invention, the optical recording apparatus of the present embodiment is configured such that the controller 16 causes the write power determination unit (WPDU) 17 to control the multi-pulse waveform of FIG. 4B when the linear velocity of rotation of the medium 1 is set in a high-speed range higher than 5.6 m/s and up to 28 m/s, such that the first pulse width "t1" of the front-end portion "fp" ranges 0.1 T to 1 T and the fourth pulse width "t4" of the tail-end portion "op" ranges 0.2 T to 1.3 T. Optimum values of the first pulse width t1 and the fourth pulse width t4 vary depending on the recording material of the recording layer of the medium 1.

Figure 5:
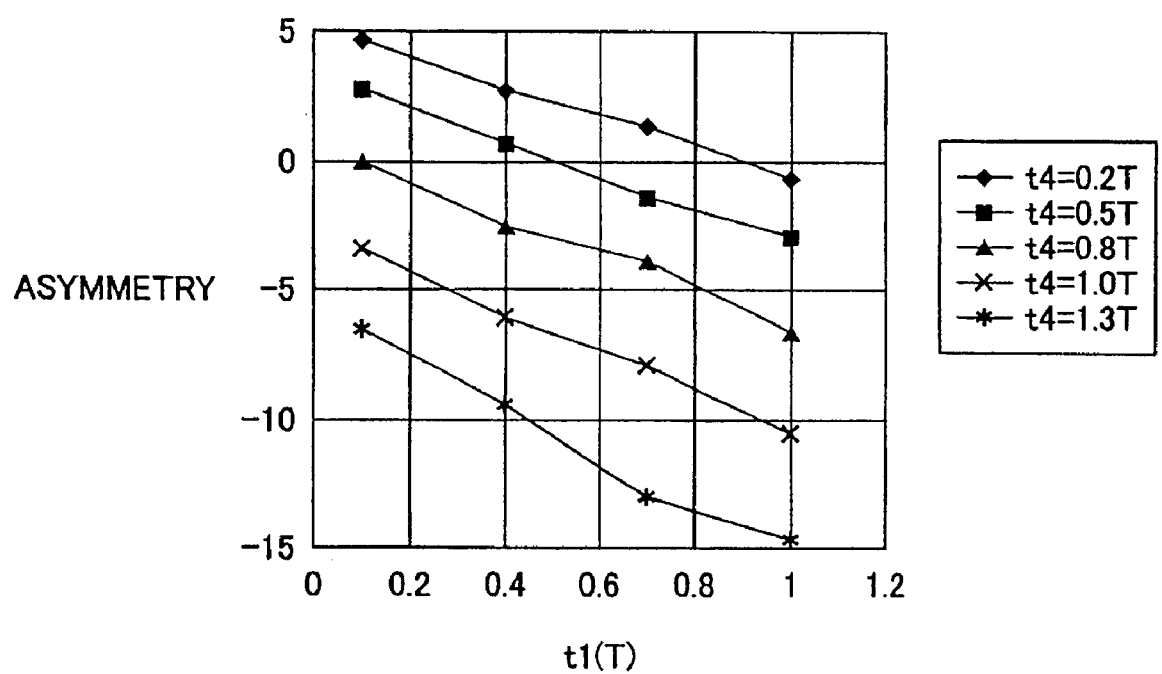
FIG. 5 is a diagram for explaining the dependence of the write signal asymmetry on the front-end pulse width and the tail-end pulse width of the multi-pulse waveform.

Experiments have been performed to ascertain the advantages of the optical recording apparatus of the present embodiment that is configured as described above. FIG. 5 shows the dependence of the write signal asymmetry on the front-end pulse width "t1" and the tail-end pulse width "t4" of the multi-pulse waveform.

In the present embodiment, the controller 16 causes the WPDU 17 to control the waveform when the linear velocity of rotation of the medium 1 is set in a high-speed range higher than 5.6 m/s and up to 28 m/s, such that the first pulse width t1 of the front-end portion ranges 0.1 T to 1 T and the fourth pulse width t4 of the tail-end portion ranges 0.2 T to 1.3 T. In order to examine the performances of high-speed recording, the experiments are performed under the following conditions.

A CD-RW disk that is provided in conformity with the above-described embodiment of the optical storage medium of the invention is used for the experiments, and the CD-RW disk is called the medium 1. The wavelength of a laser beam emitted by the laser light source of the pickup 12 in the optical recording apparatus is 780 nm. The numerical aperture (NA) of the objective lens of the pickup 12 is set at 0.5. A high-speed recording of the medium 1 is performed at 9.6 m/s linear speed (which is equivalent to 8× linear velocity of the rewritable compact disk standards).

As shown in FIG. 5, when performing the experiments, the first pulse width "t1" of the front-end portion "fp" of the multi-pulse waveform is sequentially changed to one among 0.1 T, 0.4 T, 0.7 T and 1.0 T, and, at the same time, the fourth pulse width "t4" of the tail-end portion "op" of the multi-pulse waveform is changed to one among 0.2 T, 0.5 T, 0.8 T, 1.0 T and 1.3 T with respect to each of the respective first pulse width values. By performing the experiments, the dependence of the write signal asymmetry on the front-end pulse width "t1" and the tail-end pulse width "t4" of the multi-pulse waveform is evaluated. FIG. 5 shows such results of the evaluations. Generally, the write signal asymmetry indicates the degree of asymmetry of mark length and space length, and it is represented by a normalized value obtained by dividing a difference between the average level of the radio-frequency (RF) signal amplitude of the longest mark and the average level of the RF signal amplitude of the shortest mark by the RF signal amplitude of the longest mark.

The specifications of the rewritable compact disk standards provide the requirements: $-15 \leq$ asymmetry $\leq 5$. As is apparent from the characteristics of FIG. 5, in order to meet the requirements, it is necessary that the front-end pulse width "t1" of the multi-pulse waveform ranges from 0.1 T to 1.0 T and the tail-end pulse width "t4" of the multi-pulse waveform ranges from 0.2 T to 1.3 T.

In another preferred embodiment of the optical recording method and apparatus of the invention, the optical storage medium 1 is prepared, in advance, to contain a sequence of data blocks recorded on the recording layer, each data block including first information indicative of the first pulse width t1 of the front-end portion "fp" and second information indicative of the fourth pulse width t4 of the tail-end portion "op" in the multi-pulse waveform. In the present embodiment, optimum values of the first pulse width t1 and the fourth pulse width t4 that are suited to a specific phase-change material of each individual medium 1 are predetermined. And, wobbling grooves or the like, carrying both the first information and the second information are formed on the medium 1.

In the optical recording method and apparatus of the present embodiment, prior to a start of the recording of the medium 1, a test writing process is performed in which test data blocks are recorded onto a test-write region (for example, a power calibration area PCA) of the medium 1 and a readout signal is detected from the test-write region of the medium 1, the readout signal indicative of the first information and the second information related to the test data blocks. Further, optimum values of the first pulse width t1 and the fourth pulse width t4 are calculated based on the first information and the second information indicated by the readout signal. In the present embodiment, the multi-pulse waveform is controlled based on the optimum values of the first pulse width t1 and the fourth pulse width t4.

According to the above-described embodiment, the optimum values of the first pulse width t1 and the fourth pulse width t4 in the multi-pulse waveform can be suitably determined. As the recording of the medium 1 can be performed in the optimum conditions, the optical recording method and apparatus of the present embodiment are effective in preventing the occurrence of a read error after the recording of the medium 1 is performed, due to deterioration of the write signal quality of the medium 1.

Further, for the sake of convenience of the users, it is preferred to make commercially available the optical storage medium 1 that is formatted, in advance, to contain the first information indicative of the first pulse width t1 of the front-end portion "fp" and the second information indicative of the fourth pulse width t4 of the tail-end portion "op" in the multi-pulse waveform. The formatted medium 1 of the present embodiment provides the users with the ease-to-use feature as well as good write/erase characteristics of the rewritable phase-change medium when the high-speed recording is performed.

The present invention is not limited to the above-described embodiments, and variations and modifications may be made without departing from the scope of the present invention.

What is claimed is:

1. A method of manufacturing an optical storage medium, comprising:

forming a first protective layer on a transparent substrate having guide grooves through sputtering;

forming a recording layer on the first protective layer through sputtering, wherein the recording layer has a thickness in a range between 13 nm and 17 nm;

forming a second protective layer on the recording layer through sputtering; and subsequently, recording data blocks in said recording layer indicative of first and fourth pulse widths, such that data is recorded in the medium by using a multi-pulse waveform of a light source driving power, a linear velocity of rotation of the medium being set substantially in a speed range higher than 5 m/s and up to 28 m/s, wherein the multi-pulse waveform represents a sequence of mark and space portions included in the light source driving power according to a modulated data signal, and wherein the multi-pulse waveform is set such that each mark portion has a pulse width corresponding to a multiple of a period T of a given write clock, the multi-pulse waveform including a front-end portion fp, a multi-pulse portion mp and a tail-end portion op, the front-end portion having said first pulse width with a high-power level Pw and starting from a middle-power level Pe, the multi-pulse portion including a sequence of write pulses each having a second pulse width with the high-power level Pw and a third pulse width with a low-power base level Pb, and the tail-end portion having said fourth pulse width with the base level Pb and ending at the middle-power level Pe, and wherein the optical storage medium is configured such that said first pulse width of the front-end portion ranges from 0.1 T to 1 T and said fourth pulse width of the tail-end portion ranges from 0.2 T to 1.3 T, and the recording layer of said optical recording medium is capable of recording data to meet the requirements: $-15 \leq \text{asymmetry} \leq 5$, and contain information related to the multi-pulse waveform.

2. The method of manufacturing the optical storage medium according to claim 1, wherein the recording layer is formed of a phase-change material a composition of which is represented by the formula $Ag_\alpha In_\beta Sb_\gamma Te_\delta$ $0.1 \leq \alpha \leq 3.0$
   $5.0 \leq \beta \leq 12.0$
   $60.0 \leq \gamma \leq 72.0$
   $22.0 \leq \delta \leq 30.0$.

* * * * *